United States Patent [19]

Morrison

[11] Patent Number: 4,522,832

[45] Date of Patent: Jun. 11, 1985

[54] LACTASE-CONTAINING BAKING FORMULATIONS

[75] Inventor: Bradley W. Morrison, Chateauguay, Canada

[73] Assignee: Ogilvie Mills Ltd., Montreal, Canada

[21] Appl. No.: 370,182

[22] Filed: Apr. 21, 1982

[51] Int. Cl.$^3$ .......................... A21D 8/04; G12P 19/14
[52] U.S. Cl. ........................................ 426/20; 426/62; 426/653; 435/99
[58] Field of Search ........................ 426/19, 20, 41, 42, 426/61, 62, 63, 653; 435/99, 105

[56] References Cited

U.S. PATENT DOCUMENTS

| | | | |
|---|---|---|---|
| 2,826,502 | 3/1958 | Sfortunato et al. | 435/99 |
| 3,102,033 | 8/1963 | Jackel | 99/90 |
| 3,466,176 | 9/1969 | Bundus et al. | 99/140 |
| 3,578,462 | 5/1971 | Smerak et al. | 426/20 |
| 3,888,996 | 6/1975 | Turro et al. | 426/62 |
| 4,160,848 | 7/1979 | Vidal et al. | 426/653 X |
| 4,179,335 | 12/1979 | Long et al. | 435/99 |
| 4,320,151 | 3/1982 | Cole | 426/20 X |

*Primary Examiner*—Raymond Jones
*Assistant Examiner*—Marianne S. Minnick
*Attorney, Agent, or Firm*—Bernard Beasley

[57] ABSTRACT

The present invention involves incorporating lactase enzyme into baking formulations for producing yeast leavened products which formulations include sugar and a lactose-containing dairy product, such as whey, as a protein supplement. During the dough processing, the lactose is converted into baker's yeast-fermentable glucose and galactose and consequently, the amount of expensive sugar substrate usually added to such formulations to provide food for the yeast may be generally reduced.

15 Claims, No Drawings

LACTASE-CONTAINING BAKING FORMULATIONS

FIELD OF INVENTION

The present invention relates to baking and in particular, dough formulations and baking processes which utilize yeast as the leavening agent.

Bread and related bakery products such as rolls, generally known as "yeast goods", are produced from doughs leavened with yeast. The leavening action is accomplished via the yeast enzyme systems which convert simple sugars, such as dextrose, sucrose and fructose mainly into carbon dioxide and alcohol. The principle factor in the dough-raising action of the yeast is the carbon dioxide, while the alcohol produced tends to escape from the dough and is entirely eliminated in the process. The size of the finished product is largely determined by the gas-production rate during the dough rise in the pan. The proper mellowing of the dough during the conditioning stages is due partly to the stretching caused by the yeast action; on the other hand, an increase in acidity and the creation of certain by-products in the fermentation process tend toward reducing dough elasticity. The type and purity of the strain of yeast used are obviously important in securing the proper balance between the mellowing and final leavening activities.

For the yeast to function at all, there must be carbohydrates, i.e. sugar substrates, present in the dough formulation. The amount of available sugar present in most flours, especially in North America, is very low and, in fact, almost negligible whilst the amount of sugar used in such "yeast goods" bakery products is generally high; for example as high as 20% based on flour weight. Dough formulations for bread usually contain from 2% to 6% sugar and even up to 10% in Canada, whilst sugar contents up to 12% are not uncommon in the United States where bread in general is somewhat sweeter.

It may be pointed out that the sugar content is not essential to the basic yeast action. This would occur to a limited extent in sugarless doughs as for example in the production of some ethnic yeast goods, especially breads. However, that bread is not of a typical North American type. To obtain such standard bread and in the time-restraint applied by standard North American processes, in particular, in the relatively short period between mixing the dough and introducing same to the oven, relatively rapid gas production must be obtained and this requires a sugar-substrate concentration of over 2%, and usually about 4% or more in the dough, based on flour weight. It is only under these conditions that the required gas production rate is achieved and the desired crust colour subsequently developed.

The dough formulations usually contain from 2-3½% by weight of yeast based on flour weight. However, it has been found that yeast action is inhibited by the higher sugar levels and it is necessary in such cases to increase the yeast concentration to overcome the reduced efficiency of the yeast.

The required sugar substrate has traditionally been included in the formulations in the form of, for example, sugar (sucrose), corn sugar (dextrose) and syrups such as molasses and refiners syrups, and hereinafter all sugar-substrates are included within the term "sugar". It has also been known to use dextrose produced from say, wheat starch by acid or enzymatic hydrolysis.

There have been many attempts to replace, totally or partially, the sugar content in sweet doughs because of the relatively high price of sugar, especially at the present time and no significant reversal of the upward trend is expected. However, the available sugar also affects other characteristics of the bread such as gas production, texture, grain, toasting time and crust colour. Of particular importance is the gas production rate since, as stated, if this is not sufficient, bread having the desired characteristics, especially as regards toastability, cannot be produced with the time limitations imposed by the baking processes most widely used in North America. In fact, this is the major factor which dictates that the available sugar level must be over 2% since below that level the yeast is not able to function efficiently and bring about the required gas production rate. Finding a substitute which will successfully fulfil all the functions presently provided by the available sugar is far from easy and has not as yet been successfully accomplished.

In some countries, dairy products having a significant lactose content are included as a protein supplement in such dough formulations to produce yeast goods such as the so-called "enriched breads". Refer, for example, to U.S. Pat. No. 3,888,996 which discusses generally the use of non-fat milk solids (NFDM) and whey solids in baking processes. In Canada, especially, where enriched breads constitute by far the major portion of the bread market, enriched breads must contain an approved dairy product and in particular NFDM, which contains about 45% lactose, or whey powder, which contains about 75% lactose; (refer Section 13.022 Food & Drug Act and Regulations). Also, lactose, both per se and as a component of whey, has been used in the production of flavouring material useful for imparting desirable flavouring and aromatic characteristics to leavened bakery products, refer, for example, to U.S. Pat. No. 3,102,033.

Lactose is a disaccharide of low sweetness value and in fact, in its usual (natural) form, is non-fermentable i.e. is not metabolized by baker's yeast. Consequently, as in the above cases for example, it passes through a baking process largely unaltered, adding little to the bread apart from carbohydrate bulk and a limited amount of colour to the crust and a slight improvement in eating qualities of the baked bread. In addition, it is known that lactose may be enzymatically hydrolised to yield equal amounts of the simple sugars, glucose and galactose, which are fermentable by baker's yeast. In fact, the enzyme lactase has been proposed to convert (moderately non-sweet) lactose to the soluble simple sugars referred to above to provide an increased degree of sweetness to, and also reduce the lactose content of, various dairy products such as whole milk and processed cheese and, in U.S. Pat. No. 3,446,176, to provide a synthetic bread flavour additive. In that patent, lactose in discrete whey is hydrolysed with the lactose enzyme β-galactocidase to produce galactose and glucose, yeast is then introduced and the mixture fermented. The resulting product is, in effect, a flavour enhancer for the described and claimed synthetic bread "yeasty" flavour product. The use of whey is quite optional, the same effect being obtained if glucose and-/or galactose per se are used as the growth medium for the yeast. The hydrolysis of the whey and the subsequent yeast fermentation being the hydrolysis products as substrate are totally completed prior to its incorporation into the bread flavour product and obviously, prior to the use of the latter product in the dough formulations and baking processes.

An object of the present invention is to provide a novel dough formulation for producing yeast goods wherein a significant proportion of the expensive sugar substrate included in the formulation as a growth medium for the yeast during its gas production may be eliminated.

A further object of the present invention is to provide a baking process for producing yeast goods in which a significant proportion of the required sugar content is replaced by an in situ simple sugar producing component.

SUMMARY OF INVENTION

It has now been realized, and this forms the basis of the present invention, that the lactose present in yeast goods dough formulations can be utilized to produce, in situ, simple sugars fermentable by baker's yeast and as a consequence, the amount of expensive simple sugars generally added to such formulations can be significantly reduced resulting in great economic advantage.

For example, in Canada, the production of enriched white bread by a bulk fermentation procedure generally utilizes a dough formulation containing 4% sugar and 4% whey powder. The addition of a minor "effective amount" of lactase to the formulation allows the sugar content to be reduced to about 2%—i.e. a 50% reduction—without loss of gas production and the resulting bread quality, as judged by crust colour, load volume, grain texture and toasting time, were equal to the standard product: the bread produced was actually considered marginally superior in eating qualities to the standard product.

Moreover, further bread quality parameter(s) which are usually adversely affected by a low sugar content are crumb softness and rate of firming or staling. It was found that bread produced using the present invention was undistinguishable as far as those parameters are concerned with the product produced using the usual formulation having the significantly higher sugar content.

The present invention is quite versatile and can be used to advantage with bulk fermentation, sponge and dough or straight dough baking processes.

DETAILED STATEMENT OF INVENTION

According to the present invention, in a formulation for producing yeast goods where flour, water, sugar and a fat-source material are augmented with a lactose-containing dairy product, the improvement comprising including in said formulation an effective amount of a lactase enzyme thereby allowing a reduction in the sugar content corresponding or equivalent to the amount of glucose and galactose obtainable by the enzymatic hydrolysis of the lactose by the lactase.

In another aspect, the present invention provides a process for making yeast leavened bakery products wherein a bread dough is formed by mixing a dough formulation including flour, water, sugar, a fat-source material and a lactose-containing dairy product and thereafter the dough is proofed and baked to form the product, the improvement comprising including in said dough an effective amount of lactase and reducing the amount of sugar in the formulation by an amount corresponding to the amount of glucose and galactose obtainable by the enzymatic hydrolysis in the baking process of the lactose by the lactase.

It should be emphasized that in most instances, the lactose-containing dairy product will normally already be included in the dough formulation and consequently a significant reduction in sugar addition is obtained solely by adding a very minor amount of lactase and with substantially no adverse effects on product desirable characteristics. However, the lactase may be prior combined with the lactose-containing dairy product prior to its incorporation into the dough formulation to form a baking additive.

In a further aspect therefore the present invention provides a dry baking additive for part replacement of sugar in a dough formulation containing sugar, a fat-source and yeast comprising a lactose-containing dairy product and an effective amount of lactase.

It is preferred that the lactose-containing dairy product is whey. However NFDM may be used but because of the relatively low lactose content and the fact that the amount of NFDM included in dough formulations is less than the corresponding amount of whey added, the actual amount of lactose in the formulation then available for conversion to baker's yeast-fermentable simple sugars is relatively low and consequently, the amount of sugar which may be replaced is corresponding lower.

As a fat-source, generally shortening or lard, will usually be present in the formulations used in the present invention. In instances where such fats are not used, for example, in the production of Italian bread, the normal practice is to omit NFDM and/or whey also and consequently, the advantages of the present invention cannot be achieved.

In this specification the term "effective amount" means an amount of a lactase enzyme of a predetermined activity sufficient to convert a major portion of the lactose in the lactose-containing dairy product to the simple sugars, glucose and galactose, which are fermentable by baker's yeast. It is believed that between 60% and 70% of the lactose in the lactose-containing dairy product is convertible to glucose and galactose, and hence become available to the yeast, during the baking process. It is preferred that the formulation includes an amount of lactose-containing dairy product such that the formulation comprises from 2% to 4% by weight of lactose.

Present indications are that the maximum lactase enzyme activity the lactase need have is equivalent to about 0.5% by weight, based on the lactose content of the formulation, of a fungal lactase obtained from aspergillus Orygae and having an activity of about 14,000 units/gram. However, from a practical viewpoint, levels up to about 1% by weight of the fungal enzyme referred to above, based on the amount of lactose in the formulation, may be used to take into account expected variations in stated enzyme activities, actual lactose content, etc. Moreover, levels as low as 0.3% by weight, based on the lactose in the formulation (equivalent to about 1.4 grams/lb. of lactose in the formulation) has been found to work satisfactorily. The overall preferred range is from 0.25 to 0.5% by weight, based on the weight of lactose in the formulation of the fungal enzyme referred to above or a lactase having an equivalent lactase enzymatic activity.

The present invention will be further described with reference to, but not limited by, the following specific examples.

EXAMPLE I

An enriched bread was produced via a zero bulk fermentation procedure using the following formulations:

| COMMERCIAL FORMULA: FORMULA | ENRICHED WHITE BREAD | | |
|---|---|---|---|
| | STAN-DARD | STANDARD WITH REDUCED SUGAR | IN-VEN-TION |
| ENRICHED WHITE FLOUR | 100 | 100 | 100 |
| SUGAR | 4 | 2 | 2 |
| SHORTENING | 3 | 3 | 3 |
| SALT | 2 | 2 | 2 |
| WHEY POWDER | 4 | 4 | 4 |
| YEAST | 3.25 | 3.25 | 3.25 |
| [1]EMULSIFIER | 0.25 | 0.25 | 0.25| |
| WATER | 65 | 65 | 65 |
| [2]LACTASE | — | — | 6.8| |

All values are in lbs. except * which is in grams.
[1]ATMUL 500 obtained from the Atlas Chemical Company
[2]Food grade fungal lactase obtained from *Aspergillus Oryzae* and sold under the trade mark TAKAMINE by the Enzyme Products Division of Miles Laboratories, Inc. having an activity of 14,000 units/gram.

The specific processing conditions were as follows:

Dough Mixing: Two (2) minutes at slow speed and thirteen (13) minutes at high speed using a Champion Horizontal mixer: the dough was at a temperature of 81° F. exiting the mixer:

Floor Time: Ten (10) minutes rest prior to transference to divider hopper;

Dough scaled: At twenty-seven (27) ounces (for a twenty-four (24) ounce baked weight)-single pocket dough divider and conical rounder;

Intermediate Proof: Ten (10) minutes in automatic 140 pocket travelling proofer with controlled temperature and humidity;

Proofed: Eighty-five (85) minutes at a temperature of 115° F. and 85% relative humidity in an automatic two rack proofer;

Baking: Thirty (30) minutes at a temperature 400° F. in a six-shelf revolving oven.

A major feature of the present invention is that $CO_2$ gas production is not adversely affected despite the reduced formulation sugar levels. The gas production during proofing in the above process was therefore determined the results being as follows:

| Gas Production (m.m. Pressure) | Formulation | | |
|---|---|---|---|
| | Standard (4% sugar) | Standard (2% sugar) | Invention (2% sugar & lactase) |
| 30 (mins.) | 110 | 100 | 126 |
| 60 | 213 | 200 | 240 |
| 90 | 286 | 250 | 323 |
| 120 | 363 | 300 | 400 |
| 150 | 436 | 365 | 466 |
| 180 | 511 | 420 | 510 |

As the above results clearly illustrate, the $CO_2$ gas production during the make-up process is not significantly affected when fully 50% of the normally added sugar content in the standard dough formulation is eliminated and lactase is used in the formulation as taught by the present invention. In effect, that sugar content is replaced by the lactose/lactase in situ simple sugar producing system, the sugar products of which are utilizable by the yeast.

The baked bread products were subjected to quantitative tests as follows:

| | Formulation | | |
|---|---|---|---|
| | Standard (4% sugar) | Standard (2% sugar) | Invention (2% sugar & lactase) |
| Pan Proofed (mins.) | 85 | 85 | 85 |
| Proofed/weight (cm) | 12.7 | 12.0 | 13.9 |
| Loaf Volume (cc/gm) | 5.6 | 5.2 | 6.0 |
| Crumb Softness* Gms force/10 mm | | | |
| After 24 hours | 11.6 | 14.4 | 10.3 |
| After 96 hours | 18.0 | 24.4 | 18.3 |

*Evaluated using a Baker Compressimeter

The above results clearly demonstrate that the bread obtained according to the present invention is at least equal in quality, if not superior in certain respects, to the product produced using the standard formulation.

Also, evaluations of crust colour, grain, texture and toasting time of the standard bread and bread produced according to the present invention were essentially the same.

Moreover, the products of the invention were considered marginally superior in eating qualities.

In times of high sugar prices, which occurs quite frequently, the present invention also allows a reduction in the amount of sugar which must be used and a significant saving results.

EXAMPLE II

An enriched bread was produced by straight dough procedure, using the following formulation.

| | LABORATORY FORMULA STANDARD | ENRICHED WHITE BREAD | |
|---|---|---|---|
| | | STANDARD WITH RE-DUCED SUGAR | IN-VEN-TION |
| Enriched white flour | 400 | 400 | 400 |
| Liquid Glucose syrup | 20 | 10 | 10 |
| Shortening | 12 | 12 | 12 |
| Salt | 8 | 8 | 8 |
| Whey Powder | 16 | 16 | 16 |
| Yeast | 12 | 12 | 12 |
| Emulsifier (1) | 1 | 1 | 1 |
| Water | 260 | 260 | 260 |
| Lactase (2) | — | — | 210* |

All weights are in grams except * which is in millgrams.
(1) Atmul 500 obtained from the Atlas Chemical Company
(2) Food grade fungal lactase obtained from *Aspergillus Oryzae* and sold under the trademark SUMYLACT LL 5000, assaying 14000 LU/gram, by Miles Laboratories Ltd.

The specific processing conditions were as follows:

DOUGH MIXING

One half (½) minute at low speed and two and one half (2½) minutes are Second speed using a Hoabart Mixer (5 qt) equipped with the McDuffy Bowl. The dough temperature was 82° F. when mixed.

FERMENTATION

One (1) hour in a temperature controlled fermentation cabinet maintained at 86° F.

PUNCH

The doughs were de-gassed, scaled to 540 grams per loaf, rounded and replaced in fermentation vessels for a further one-half (½) hour.

MAKE-UP

Doughs were sheeted through the National Moulder and Sheeter and made up according to the procedure of the American Association of Cereal Chemist and panned.

PROOFED

Foe one hour (1) at 115° F. and 85° R.H. in a temperature, humidity controlled cabinet.

BAKING

Thirty (30) minutes at 400° F. in a six shelf revolving tray oven.

A major feature of the present invention is that $CO_2$ gas production is not adversely affected despite reduced formulation sugar levels. The gas production during fermentation and proofing in the above process was determined, the results being as follows:

| GAS PRO-DUCTION MM PRESSURE | FORMULATION | | |
|---|---|---|---|
| | STANDARD 5% GLUCOSE | STANDARD 2½% GLUCOSE | INVENTION 2½% GLUCOSE LACTASE |
| 30 minutes | 110 | 95 | 100 |
| 60 minutes | 195 | 170 | 180 |
| 90 minutes | 270 | 235 | 265 |
| 120 minutes | 345 | 315 | 330 |
| 150 minutes | 435 | 390 | 420 |
| 180 minutes | 505 | 455 | 490 |
| 210 minutes | 550 | 495 | 525 |
| 240 minutes | 580 | 535 | 550 |
| 270 minutes | 600 | 555 | 630 |
| 300 minutes | 620 | 575 | 710 |

As the above results clearly illustrate, the $CO_2$ gas production during the dough make-up process is not significantly affected when fully 50% of the normally added sugar in the standard formula is eliminated and lactase is used in the formulation according to the present invention. In effect, that sugar content is replaced by the lactose/lactase simple sugar producing system which in situ produces sugar products which are utilizable by the yeast. It can readily be appreciated, especially where the addition of milk solids containing lactose is mandatory or otherwise required, that the present invention allows for significant savings.

The baked products were subjected to the following tests and observations:

| | FORMULATION | | |
|---|---|---|---|
| | STANDARD 5% GLUCOSE | STAN-DARD 2½% COSE | INVENTION 2½% GLU-COSE + LACTASE |
| PROOF TIME (MIN) | 60 | 60 | 60 |
| PROOF HEIGHT (CM) | 12.7 | 12.3 | 13.3 |
| VOLUME (CC/GM) | 5.2 | 5.1 | 5.5 |
| CRUST COLOUR | medium | medium − | medium + |

The above results clearly demonstrate that the bread obtained according to the present invention is equal to or better than standard with respect to gas production and retention thereof in the dough during fermentation, proofing and baking. Moreover, the residual sugars resulting from the in situ production of glucose/galactose from lactose was evidenced by the more enhanced colour of the crust of the baked bread from the formulation according to the present invention.

I claim:

1. In a formulation for producing baked yeast goods comprising flour, water and an added amount of discrete yeast fermentable sugar sufficient to produce a desired degree of leavening in said baked yeast goods, a fat-source material and a lactose-containing dairy product, the improvement comprising:

an added lactase enzyme in an enzymatic amount selected so as to be sufficient to produce, in situ, during the preparation of said yeast goods, a quantity of yeast-fermentable glucose and galactose by enzymatic hydrolysis of the lactose contained in said dairy product;

whereby the amounts of said glucose and galactose so produced are sufficient to permit a corresponding reduction in said added amount of discrete yeast fermentable sugar to thereby provide a sufficient total amount of yeast-fermentable sugars in said formulation, to produce said desired degree of leavening.

2. A formulation according to claim 1 wherein the lactose-containing dairy product is present in an amount whereby the formulation contains from 2.0% to 4.0% by weight of lactose based on flour weight.

3. A formulation according to claim 1 wherein the lactose-containing dairy product is whey.

4. A formulation according to claim 1 wherein the fat source material is shortening.

5. A formulation according to claim 1, 2 or 3 wherein the lactase has a lactase enzyme activity equivalent to up to 1.0% by weight, based on the amount of lactose in the formulation, of a fungal enzyme obtained from *Aspergillus oryzae* and having an activity of 14,000 units per gram.

6. A formulation according to claim 1, 2 or 3 which contains from 0.25% to 1.0% by weight, based on the amount of lactose in the formulation, of a fungal enzyme obtained from *Aspergillus oryzae* and having an activity of 14,000 units per gram.

7. A formulation according to claim 1, 2 or 3 which contains from 0.25% to 0.5% by weight, based on the amount of lactose in the formulation, of a fungal enzyme obtained from *Aspergillus oryzae* and having an activity of 14,000 units per gram.

8. In a process for making yeast-leavened bakery products wherein a bread dough is formed by mixing a dough formulation including flour, water, an added amount of discrete yeast-fermentable sugar sufficient to produce a desired degree of leavening of said formulation, a fat source material and a lactose-containing dairy product and thereafter the dough is proofed and baked to form the product, the improvement comprising:

including in said dough an added lactase enzyme in an enzymatic amount selected so as to be sufficient to produce, in situ, during the preparation of said yeast goods, a quantity of yeast-fermentable glucose and galactose by enzymatic hydrolysis of the lactose contained in said dairy product;

whereby the amounts of said glucose and galactose were sufficient to permit a corresponding reduction in said amount of discrete yeast-fermentable sugars present in said formulation to thereby provide a sufficient total amount of yeast-fermentable sugars in said formulation, to produce said desired degree of leavening.

9. A process according to claim 8 wherein the lactose-containing dairy product is present in an amount such that the formulation contains from about 2% to 4% by weight of lactose.

10. A process according to claim 8 wherein the lactose-containing dairy product is whey.

11. A process according to claim 8 or 9 wherein the fat-source material is shortening.

12. A process according to claim 8 wherein the lactase has a lactase enzymatic activity equivalent up to 1.0% by weight, based on the amount of lactose present in the formulation, of a fungal enzyme obtained from *Aspergillus oryzae* and having an activity of about 14,000 units per gram.

13. A process according to claim 8 wherein the lactase is a fungal enzyme obtained from *Aspergillus oryzae* and having an activity of about 14,000 units per gram and is present in an amount of up to 1.0% by weight, based on the lactose present.

14. A process according to claim 8 wherein the lactase is a fungal enzyme obtained from *Aspergillus oryzae* and having an activity of about 14,000 units per gram, and is present in an amount of up to 0.25% to 0.5% by weight, based on the lactose present.

15. A process according to claim 8 or 9 which is a bulk fermentation baking process.

* * * * *